US006917365B2

(12) United States Patent
Riemens et al.

(10) Patent No.: US 6,917,365 B2
(45) Date of Patent: Jul. 12, 2005

(54) PROCESSOR PROVIDED WITH A SLOW-DOWN FACILITY THROUGH PROGRAMMED STALL CYCLES

(75) Inventors: Abraham Karel Riemens, Eindhoven (NL); Nathan Woods, Hoffman Estates, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 208 days.

(21) Appl. No.: 10/207,507

(22) Filed: Jul. 29, 2002

(65) Prior Publication Data

US 2003/0070107 A1 Apr. 10, 2003

Related U.S. Application Data

(63) Continuation-in-part of application No. 09/920,042, filed on Aug. 1, 2001.

(51) Int. Cl.[7] .............................................. G06F 13/372

(52) U.S. Cl. ....................... 345/534; 345/503; 345/519; 345/541; 713/322; 713/500; 713/501; 713/600; 713/601

(58) Field of Search ................................. 345/503, 519, 345/520, 531, 534, 535, 541; 713/322, 500, 501, 600, 601

(56) References Cited

U.S. PATENT DOCUMENTS

| | | | | |
|---|---|---|---|---|
| 4,981,296 A | * | 1/1991 | Shiraishi et al. | 713/501 |
| 5,175,844 A | * | 12/1992 | Fukuda et al. | 713/600 |
| 5,719,800 A | * | 2/1998 | Mittal et al. | 713/321 |
| 5,896,141 A | * | 4/1999 | Blaho et al. | 345/541 |
| 5,953,685 A | * | 9/1999 | Bogin et al. | 702/136 |
| 6,058,450 A | * | 5/2000 | LaBerge | 710/107 |
| 6,662,278 B1 | * | 12/2003 | Kahn et al. | 711/154 |

OTHER PUBLICATIONS

"True–Motion Estimation with 3–D Recursive Search Block Matching", by Gerard de Haan et al., IEEE Trans. CVST. Oct. 1993. pp. 368–379.

* cited by examiner

*Primary Examiner*—Ulka J. Chauhan
(74) *Attorney, Agent, or Firm*—Michael J. Ure

(57) ABSTRACT

A processor executes image processing under control of a clock facility, such that a sequence of C effective clock cycles will effect a processing operation of a predetermined amount of image information. In particular, the processor has programming means for implementing programmable stall clock cycles interspersed between the effective clock cycles for implementing a programmable slowdown factor S, such that a modified number of C*S overall clock cycles will effect processing of the predetermined amount of digital signal information.

14 Claims, 3 Drawing Sheets

Table 1 Highway data transfers for 128x8 pixels for frm-fld scalability

| | ME | MC with 50i/60i output | MC with 100i/120i or 50p/60p output | MC output 100p/120p |
|---|---|---|---|---|
| Prev. frame input | 2 x 8 | 2 x 8 | 2 x 8 | 2 x 8 |
| Curr. field input | 2 x 4 | 2 x 4 | 2 x 4 | 2 x 4 |
| Next frame input | 2 x 4 | 2 x 4 | 2 x 4 | 2 x 4 |
| Vector input | 4 | 1 | 1 | 1 |
| Vector output | 1 | | | |
| SAD best output | 1 | | | |
| SAD sel. output | 1 | | | |
| Rec. frame output | | 8 | 8 | 8 |
| Both display outputs | | 4 | 8 | 2 x 8 |
| **Total Transfer** | **39** | **45** | **49** | **57** |
| **Total Bytes [a]** | **4992** | **5760** | **6272** | **7296** |

a. All transfers are 128 bytes.

FIG. 5

Table 2 Data rates during ME/MC for frm-fld-fld scalability

| | ME | MC 50i/60i | MC 100i/120i or 50p/60p | MC 100p/120p |
|---|---|---|---|---|
| Bytes | 4992 | 5760 | 6272 | 7296 |
| Cycles | 1024 | 1600 | 1600 | 1600 |
| Bytes/Cycle | 4.88 | 3.60 | 3.92 | 4.56 |
| MBytes/sec. | 732 | 540 | 588 | 684 |

FIG. 6

PROCESSOR PROVIDED WITH A SLOW-DOWN FACILITY THROUGH PROGRAMMED STALL CYCLES

CROSS REFERENCE TO RELATED APPLICATIONS

This is a continuation-in-part of application Ser. No. 09/920,042, filed Aug. 1, 2001, which is herein incorporated by reference.

BACKGROUND OF THE INVENTION

The invention relates to a processor according to the preamble of claim 1 hereafter appended. At present, there is a trend in circuitry design towards building a so-called Digital Video Platform (DVP) that will perform various multimedia-processing functions. Such functions may be effected in hardware, in software, or in a mixture thereof, such choice depending on the processing function itself, and/or on the manufacturing volume of the function and/or circuit in question. The multimedia may include video, graphics, audio, or other.

For reasons of economy, quite often such processor will be dedicated to the execution of only a limited subset of those functions, often even to executing only a single one function. This policy will render a shared bus that connects the various processors to a background memory a key facility of an overall processing system. Now, for controlling the overall system, often furthermore a Central Processing Unit (CPU) will be provided. Next to controlling the background memory, the CPU may immediately access various control registers in the various processors. The number of such processors in realistic systems may have risen to 10–20.

The present invention is directed to solving a problem that has been recognized when designing a multi-function coprocessor that is able to perform both Motion Estimation (ME) and Motion Compensation (MC). These functions are used in video format conversion systems; some examples of such systems have been described by G. de Haan, et al., in an article "True motion estimation with 3-D recursive block batching", IEEE Trans CSVT, October 1993, p. 368.388. In a complex system like this, the prevailing bandwidth on the shared bus is a prime design issue, and the various processors should maintain synchronization on the time slot level of the processing of an entire field or frame.

SUMMARY TO THE INVENTION

In consequence, amongst other things, it is an object of the present invention to allow programmable slowdown of one or more of the processors being effected in a straightforward manner. Now therefore, according to one of its aspects the invention is characterized according to the characterizing part of claim 1. The inclusion of stalling cycles will appreciably lower busload, leaving free the remainder of the bus capacity that may be applied to other purposes.

Advantageously, the programming means are arranged according to claim 7. This is a straightforward and hardware-efficient solution.

BRIEF DESCRIPTION OF THE DRAWING

These and further aspects and advantages of the invention will be discussed more in detail hereinafter with reference to the disclosure of preferred embodiments, and in particular with reference to the appended Figures that show:

FIG. 5, a Table showing Highway Transfer Data for a standard-size scalable pixel block;

FIG. 6, a further Table showing Data Rates during ME/MC for implementing such scalability.

DETAILED DESCRIPTION OF PREFERRED EMBODIMENTS

Figure 1:
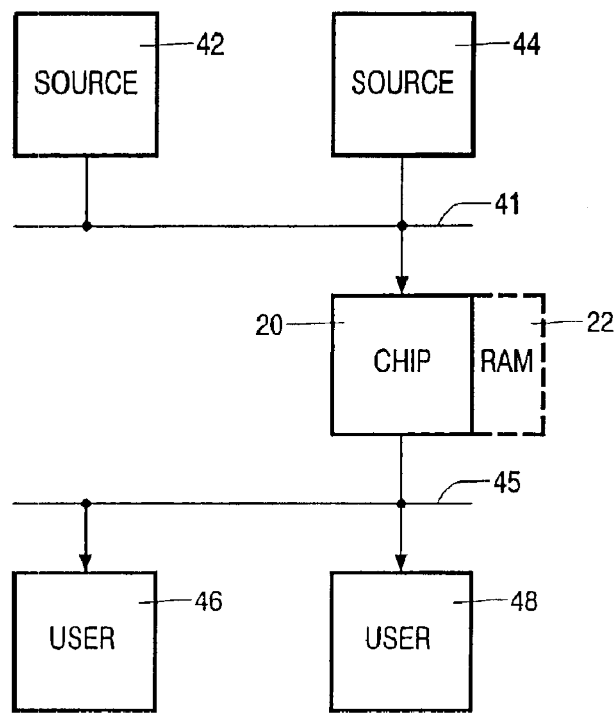
FIG. 1, a general block diagram of a video processing system.

FIG. 1 illustrates a general block diagram of a video processing system. In this conceptual arrangement, signal sources, and in particular, video sources 42, 44, will present video images for processing onto input communication facility 41 that may be a bus or another sharing organization among various stations. Item 20 is a processing chip, which will be discussed more in detail hereinafter, and which will process the images as received. To this effect, chip 20 is associated to RAM 22 that may store an appropriate amount of information to smoothingly cope with peak flows from sources 42, 44, and as the case may be, with peak requests from video users 46, 48. The latter will use video images as having been processed by chip 20. To this effect, items 20, 46, 48, are mutually interconnected through output communication facility 45 that may be a bus or may be sharing among stations in another manner.

Figure 2:
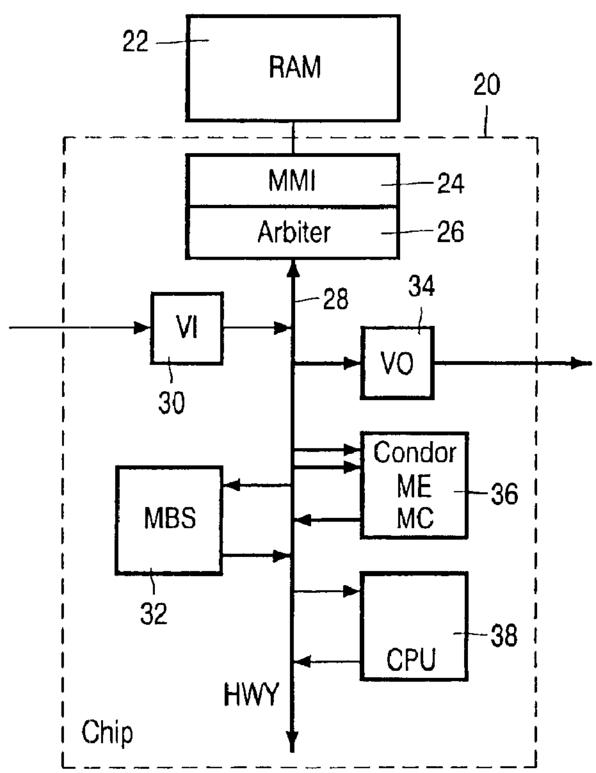
FIG. 2, a multiprocessor chip embodying the present invention.

FIG. 2 illustrates a multiprocessor chip that is arranged for executing the processing and therewith embodying the present invention. Apart from the Random Access Memory 22, the remainder of the Figure has been compacted into a Single Solid State chip 20. Within this chip, interfacing between bus facility or Onchip Data HighWay 28 and memory 22 is by way of Main Memory Interface 24 and Bus Arbiter 26. Further bus-connected subsystems are Video Input Interface 30, Memory Based Scaler 32, Video Output Interface 34, Central Processing Unit 38 and Processor 36 that executes both Motion Estimation and Motion Compensation. By themselves, M.E. and M.C. are common features of processing a multi-image sequence such as a film or animation, and the associated procedures will not be discussed herein for reasons of brevity. The same applies to the overall image processing functionality to be provided by processor 36 and the hardware and software facilities necessary therefor.

For discussing the relevance of the data transfer on the bus facility, various modes of use will be considered. Now, the processor 36 may operate in a time-multiplexed manner on three prime tasks. First, it calculates the motion vectors of an applicable image (ME), then it performs motion compensation on the luminance signal (MC-Y), and finally, it performs motion compensation on the chrominance signal (MC-UV). In principle, the processing block in question may handle an image of arbitrary size, but in the embodiment the maximum throughput is two video streams of 512*240 pixels at 60 Hz, or alternatively 512*288 pixels at 50 Hz. A particular standardized stream amounts to 720*240 pixels at 60 Hz, or alternatively, 720*288 pixels at 50 Hz.

Examples of use are defined by various operational parameters. The actual display mode determines which conversion must be executed, which is usually a fixed property of a particular video product once it has been designed, inasmuch as changing of the display scan format is often unviable. The display mode has the following parameter values for determining the actual conversion.

Note that the selecting and management among all of these cases is controlled by the CPU, and some of these selection and management functionalities may even be changed dynamically, during run-time.

Applicable data rates are as follows 50 i/60 i=1 times the data rate 100 i/120 i=2 times the input data rate;

100 p/120 p=4 times the input data rate.

The scalability mode allows the application to effect a trade-off between image quality and the amount of resources used, such as highway bandwidth and available amount of background memory. This effectively controls the quality attained versus the resources that are availble. Various possibilities are as follows:

frm-fld-fld, previous frame, current field, and next field;

frm-fld, previous frame and current field fld-fld, previous field and current field The data mode controls the amount of video that must be processed, such as only one main widow, as distinct from a background combined with a picture-in-picture display. Various possibilities are:

one "standard" stream of 720 pixels width two "small" streams of 512 pixels width Anything else that may lie within the maximum supported image size The block 36 has been designed in the embodiment with the following properties:

Motion estimation requires 1024 cycles to process 128×8 pixels

Motion compensation requires 1600 cycles to process 128×8 pixels

The clock frequency is 150 MHz.

Figure 3:
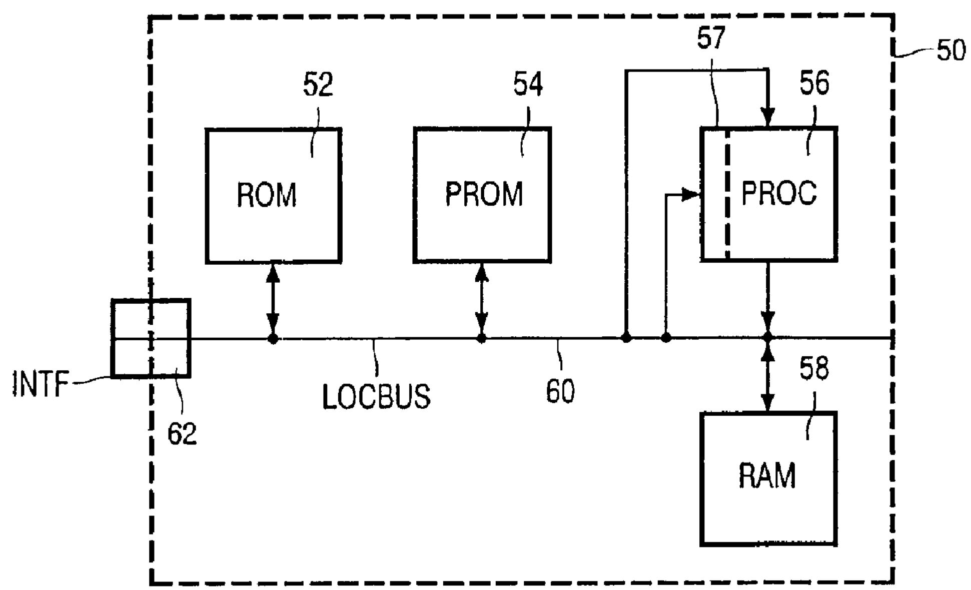
FIG. 3, a programmable video processor according to the present invention.

FIG. 3 illustrates a programmable video processor according to the present invention. Within processor 50 there is an interface for communicating with other subsystems such as those shown in FIG. 2. Internal communication is effected by internal local bus 60. The various stations or facilities connected thereto are program ROM 54, programmable PROM 54 for storing program and/or data, data RAM 58, and finally processing element 56 that has both input and output coupled to the local bus 60.

A key item in the processing element is register file 57, that is loadable from bus 60 as shown. Various further control, address, and data interconnection lines have been ignored for brevity, inasmuch as they would represent straightforward solutions to persons skilled in the art. Regarding the overall set-up in FIG. 2, the data inputs and outputs functionally connect to data highway 28. The control input, including the bading of register file 57 is typically fed by CPU 38. The CPU can set various bits in register file 57. Data will be received from shared memory, processed by the coprocessing element, and the results thereof will be stored in the shared memory. Typically, the processing constitutes a parameterized data pipe, that has its processing parameters read from the control register file. The pending on the various control bits, one or more data inputs and/or outputs may be activated. Also the function being performed depends on such control bits.

Figure 4:
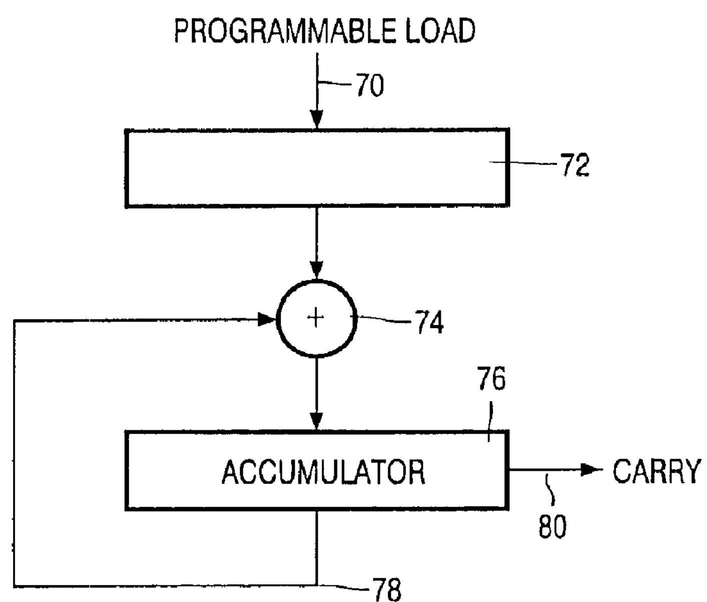
FIG. 4, an embodiment of a programming accumulator.

FIG. 4 illustrates an embodiment of a programming accumulator. Herein, a programming register 72 is loaded via line 70 with a first number. Under clock synchronization, the register content is forwarded to adder 74 for addition to the content of accumulator register 76, the content being retrocoupled through interconnection 78. The sum of the two data is written back to accumulator storage facility 76. Now, the higher the content of register 72, the more frequently carry output 80 from accumulator 76 generate a carry signal. The carry signal may then control an effective clock cycle for therewith having execute the processor of the present invention an image processing. However, in the preferred embodiment of the present invention, the carry signal will control a stall cycle where in no effective data processing is done. Therefore, as more frequent carry signals will be present, the more stall cycles will be inserted, effectively slowing down the date processing by the coprocessor. An additional reason for preferring the latter embodiment is that it would allow the carry signals to be ORED with other causes for stalling, such as FIFO overflow in the processing element's output or FIFO underflow in the processing element's input.

FIG. 5 is a Table showing Highway Transfer Data for a standard-size scalable pixel block of 128×8 pixels, during motion estimation and motion compensation for the various display modes. Motion estimation and motion compensation require approximately the same input data but produce different output data, and also different amounts of output data. Clearly, the total variation is about +50% in the rightmost column.

FIG. 6 is a further Table showing Data Rates during ME/MC for such scalability, and in particular, the consequences arising for the highway bandwidth during ME and MC for the various display modes recited supra. In a typical system, the memory is operating at 166 MHz, 32 bits dual data rate, which results in a theoretical maximum highway bandwidth of (166*2*4) or approximately 1200 Mbyte/sec.

During ME, the throughput requirement is 732 Mbyte/sec. This bandwidth should therefore in principle being continually available, even in a relatively slow 50 i/60 i system. On the other hand, one would wish that such relatively slow system should be able to operate at a lowered data rate in comparison with the modes requiring higher display rates. In fact, one should wish to relinquish a certain amount of bandwidth, at a cost of a few extra clock cycles. In consequence, the present invention offers a programmable slow down facility, inasmuch as the optimum would depend on the actual display mode. A further requirement is to have the present invention introduce a facility to save bandwidth also for the processing of smaller images.

The present invention will therefore offer a programmable slowdown factor in the digital circuitry of the coprocessor. For a slowdown factor of S, that is any real number, $\geqq 1$, the following holds:

Motion Estimation requires S*1024 cycles to process 128*8 pixels;

Motion Compensation requires S*1600 cycles to process 128*8 pixels.

On the basis of the software governing the display motion, the slowdown factor will be easily set in this manner. An advantageous embodiment is through an accumulator that periodically accumulates an appropriate operand. The carry output will rise to high whenever the accumulator overflows. The carry out will be controlled by the overflows/wraps, for thereby controlling the stalling of the overall processor. Giving a few embodiments hereinafter for Motion Estimation would render the presenting of similar measures for Motion Compensation superfluous.

For a value of S=1.215, we want 1024*1.215=1244 cycles to compute 128*8 pixels. That means that we want stalling 1244−1024=220 times in a 1244 cycle interval. The correct programming would therefor be $\underline{x}$=220/1244=0.1768489.

For a value of S=16, we want 1024*16=16384 cycles to compute 128*8 pixels. That means that we want stalling 16384−1024=15360 times in a 16384 cycle interval. The correct programming would therefor be x=15360/16384=0.9375. Clearly, x=(S−1)/S. Implementing a long accumulator register will allow accurate programming of the required factor. A 10-bit accumulator has the parameter N to be set by the CPU to control the programmable slowdown: N=round (1024*x). For the two factors supra, such will result in the following:

| | | |
|---|---|---|
| S = 1.215; | x = 0.1768489; | N = 181. |
| S = 16; | x = 0.9375; | N = 960. |

Various other floating points to integer conversions could also be used to generate the stall cycles. A case in point is to do so whilst using a truncation operation.

A further advantage of the programmable stalling according to the preceding is that it will allow other bus master stations, such as other coprocessors that have a lower priority than memory, to have relatively smaller buffers than would have been the case otherwise. Especially in the interval during which the stalling processor does not access the bus, lower priority master stations will be periodically allowed to temporarily grab the bus. In fact, this feature leads to smaller IC area, and inherently, to lower manufacturing costs.

The programmable processing slowdown of the present invention allows for still another advantageous feature. As has been mentioned supra, other causes for stalling could be present, such as buffer overflow and/or underflow. Still another cause would be represented by excessive highway latency, such as through bus loading by other coprocessors. For these latter causes, generally only a limited time budget is available. If however, this time budget is exceeded, the coprocessor according to the present invention will not be finished in time, which in a prior art system represents a failure.

Therefore, according to a preferred embodiment of the present invention, an extra interrupt signal would be generated when the number of these extra stalls, i.e., other than currently programmed, exceeds a predetermined threshold. This further interrupt will then start a feedback that may decrease the slowdown factor associated with the programmed slowdown. This may be done by amending the recurrency of the stall cycles, such as through addressing another item in register file 57 in FIG. 3. Another solution is by having the bus arbiter allocate more bandwidth to the coprocessor according to the present invention.

In fact, the hardware itself could adjust its stalling recurrency by undertaking to maintain a programmable constant stall rate. If such cannot be achieved through excessive highway latency, the hardware could interrupt the processor. The processor could then allocate more bandwidth to the coprocessor by reprogramming the arbiter to another allocation parameter value. Still another approach is to amend the overall control parameters of the coprocessor to exploit its scalability, such as by falling back to a three-field mode for motion compensation to guarantee that everything gets computed within the available time schedule.

The above embodiments of the invention have been presented by way of examples, rather than by way of limitation. In consequence, persons skilled in the art will recognize various changes and amendments that would not exceed the scope of the invention, inasfar as such scope has been covered by the appended claims. In particular, the invention may be applied in other field that use signal processing, such as applied to audio, graphics, and other.

What is claimed is:

1. A processor for executing digital signal processing under control of a clock facility, such that sequence of C effective clock cycles causes the processor to effect a processing operation of a predetermined amount of digital signal information, C being known in advance, said processor being characterized in having programming means for implementing programmable stall clock cycles interspersed between said effective clock cycle for implementing a programmable slowdown factor S, known in advance, such that a modified number of C*S overall clock cycles causes the processor to effect processing of said predetermined amount of digital signal information.

2. A processor as claimed in claim 1, and having said programming means controlling the interspersing in an at least substantially periodical manner.

3. A processor as claimed in claim 1, effectively representing a coprocessor and having a control processor as said programming means.

4. A processor as claimed in claim 3, wherein said coprocessor and said control processor are interconnected y a bus to a shared memory facility.

5. A processor as claimed in claim 4, wherein said coprocessor, said control processor and said bus are disposed on a single semiconductor chip, whereas said shared memory facility is at least substantially off-chip.

6. A processor as claimed in claim 5, wherein at least one other bus station that the coprocessor is allowed to grab the bus in a time interval during a said stall cycle.

7. A processor as claimed in claim 1, and being arranged to execute at least two different modes, the modes being characterized by requiring different amounts of data to be processed under respective different percentages of stall clock cycles.

8. A processor as claimed in claim 1, said stall cycles being generated by a floating point to integer conversion.

9. A processor as claimed in claim 1, wherein said programming means drive an incrementable storage facility through a periodical increment by a number N that is a function of said factor S according to N=round (R*x), wherein x=(S−1/S) and R is the range of the storage facility, and wherein a carry output signal of the storage facility will generate a stall cycle.

10. A processor as claimed in claim 1, wherein said programming means drive an arithmetic element that is arranged for executing an addition or subtraction operation with regard to a programmed value, and said addition or subtraction will in a first case produce a carry or borrow signal, respectively, and in a second case not produce such carry signal or borrow signal, respectively, and wherein a transition from a stall cycle to an effective processing cycle will be controlled by a transition between said first and second states.

11. A processor as claimed in claim 1, furthermore having an origin for controlling second stall cycles, and comprising a detection facility for detecting an excessive number of said programmable stall cycles and said second stall cycles combined, and said processor having a control facility fed by said detection facility for then amending a recurrency of said programmable stall cycles.

12. A processor as claimed in claim 11, wherein said detection facility is arranged for generating an interrupt signal.

13. A processor as claimed in claim 11, wherein said detection facility is arranged for letting a bus arbiter allocate more bandwidth to the coprocessor in question.

14. A processor as claimed in claim 1, furthermore having an origin for controlling second stall cycles, and comprising a detection facility for detecting an excessive number of said programmable stall cycles and said second stall cycles combined, and said processor having a control facility fed by said detection facility for then amending one or more control parameters of the coprocessor through exploiting its scalability.

* * * * *